May 19, 1953 C. H. STUIVENBERG 2,638,842

PROCESS AND APPARATUS FOR ANALYZING CARDS

Filed Aug. 6, 1947 5 Sheets-Sheet 1

INVENTOR
CORNELIS HENDRICUS STUIVENBERG
BY
Toulmin & Toulmin
ATTORNEYS

May 19, 1953 C. H. STUIVENBERG 2,638,842

PROCESS AND APPARATUS FOR ANALYZING CARDS

Filed Aug. 6, 1947 5 Sheets-Sheet 2

INVENTOR
CORNELIS HENDRICUS STUIVENBERG
BY
Toulmin & Toulmin
ATTORNEYS

May 19, 1953 C. H. STUIVENBERG 2,638,842

PROCESS AND APPARATUS FOR ANALYZING CARDS

Filed Aug. 6, 1947 5 Sheets-Sheet 3

INVENTOR

CORNELIS HENDRICUS STUIVENBERG

BY

Toulmin & Toulmin

ATTORNEYS

INVENTOR
CORNELIS HENDRICUS STUIVENBERG
BY
Toulmin & Toulmin
ATTORNEYS

May 19, 1953 C. H. STUIVENBERG 2,638,842

PROCESS AND APPARATUS FOR ANALYZING CARDS

Filed Aug. 6, 1947 5 Sheets-Sheet 5

INVENTOR

CORNELIS HENDRICUS STUIVENBERG

BY

Toulmin & Toulmin

ATTORNEYS

Patented May 19, 1953 2,638,842

UNITED STATES PATENT OFFICE 2,638,842

PROCESS AND APPARATUS FOR ANALYZING CARDS

Cornelis Hendricus Stuivenberg, Haarlem, Netherlands

Application August 6, 1947, Serial No. 766,772
In Germany December 31, 1942

Section 1, Public Law 690, August 8, 1946
Patent expires December 31, 1962

12 Claims. (Cl. 101—93)

The invention relates to a method of an apparatus for analyzing cards, which have been provided with symbols for denoting certain values, e. g. figures, characters, signs, for controlling machines, especially punched card machines. It is known, in order to increase the capacity of such cards, to apply a number of fields of symbols below each other on the cards. In analyzing the cards these fields are consecutively read or detected and analysed in a separate operation. Thus, the time required for analysing the cards with, for example, two fields each is about twice as long as that required for reading a single field.

According to the invention a number of fields of symbols or parts of such fields, lying behind each other with respect to the direction of movement of the cards, are read in one and the same operation during the movement of the cards. By this method several advantages of great importance for the analysis of the cards are obtained. The capacity of the machines is increased appreciably. The contents of the fields or parts thereof may be analysed simultaneously. In the case of card sorting machines, for example, cards with given symbols distributed over several fields may be sorted in a single operation. The same advantage is obtained in the case of card feeding and delivery devices, by means of which out of a number of piles of cards each time a card is read and the cards are collated and directed differently in accordance with the result of such collation. In the case of list printing machines the additional advantage is obtained that data which have been printed on the cards in the same columns, but in different fields, may be printed simultaneously side by side.

The process according to the invention is of special advantage when for denoting the values combinations of symbols in a number of positions are used. If, for example, six positions are used, there are 64 different possibilities for the symbol, which suffice for all figures, characters and numerous symbols.

In another embodiment of the process the positions of the different fields overlap each other, in such a manner that in the direction of movement of the cards consecutive symbols belong to different fields. Thus the capacity of the machines is increased considerably, since in the first place inactive sections are avoided and further the symbols belonging to the same field are spaced more liberally than (in the case) when the symbols of the image or signal have been applied consecutively, without the interpolation of symbols of other fields.

The process is carried out by means of a device consisting of a distributor between the reading device and the analyzing device, which distributor transfers the movements or power actions brought about by the symbols from the reading device to the analyzing devices belonging to the various fields.

In carrying out the process use is made of cards on which data pertaining to the same transaction have been applied in a number of fields in the shape of symbols, e. g. perforations. Thus it is avoided that for pointing out many data pertaining to the same transaction a number of cards should have to be used, as a result of which considerable space for recording data would be lost, because a number of data designating the fact that the various cards belong together would have to be repeated on all the appertaining cards. It is known, indeed, in order to utilize the paper more fully, to use a card successively for two different operations by providing the card with different systems of perforations to be used successively for the analysis, one of these systems occupying the spaces left open between the perforations of the other system. However, these known cards save paper only in that old, used cards are utilized once more for another business operation. The above-mentioned advantages of the apparatus according to the invention are thus not attained.

In the drawing the apparatus according to the invention is illustrated.

Figure 1:
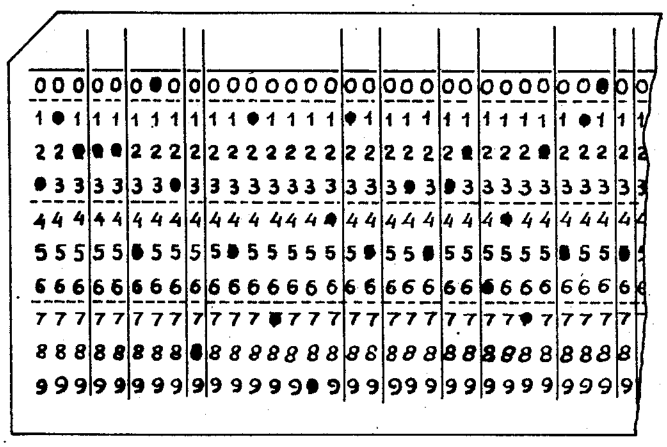
Fig. 1 illustrates a known punched card containing only one field.

The punched card illustrated in Fig. 1 is used for applying the counting point positions in the usual manner. The number of figure values that can be punched on the card is limited by the number of columns for perforations. If this number of columns is not sufficient to place all the symbols referring to a single card, up to the present it was necessary to provide so-called supplementary cards with perforations, these cards then pertaining to a given transaction in combination with the main card. However, the supplementary cards could not be fully utilized, because certain data, such as numbers of groups and the like, had to be punched on them as they had been on the main card, so as to denote the fact that the two cards belonged together. Owing to the punching of these data on the supplementary card as well, a certain number of perforation columns could not be used for the punching of additional data.

Figure 2:
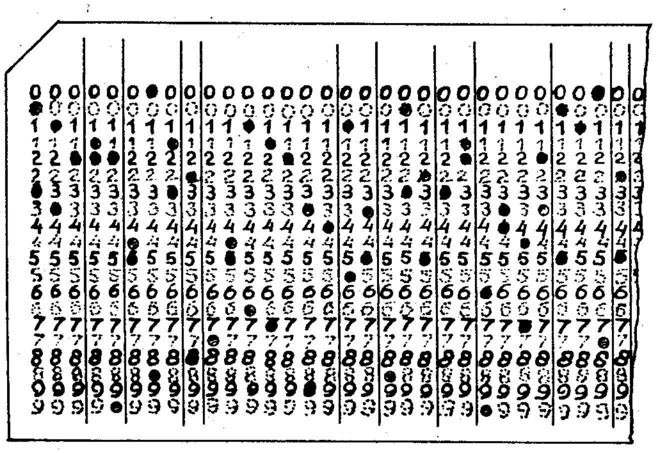
Fig. 2 illustrates a card for carrying out the process according to the invention, which card contains data pertaining to the same transaction in the shape of symbols in two fields.

The card illustrated in Fig. 2 has been provided with two fields for taking up symbols referring to the same transaction. The fields are divided into strips in such a way that strips succeeding each other in the direction of movement of the card belong to different fields, i. e. each strip contains a symbol position, so that in the direction of movement of the card the first symbol position of the first field is followed by the first symbol position of the second field, etc. Since the strips of the two fields succeeding each other in the direction of movement of the card are read and analysed in the same operation during the movement of the card, according to the invention, all the columns of the two fields can be utilized for placing symbols referring to the same transaction, while numbers of groups and similar data need be placed only once. Thus, the card according to Fig. 2 in the first place presents the advantage over the use of a main and a supplementary card that all data referring to the same transaction can be analyzed in one operation, whereas otherwise the main card and the supplementary card would require one operation each. Secondly, the card according to Fig. 2 presents the advantage that a larger number of columns for taking up symbols becomes available, since a repetition of some of the data, as is required on the supplementary card, has become superfluous.

Figure 3:
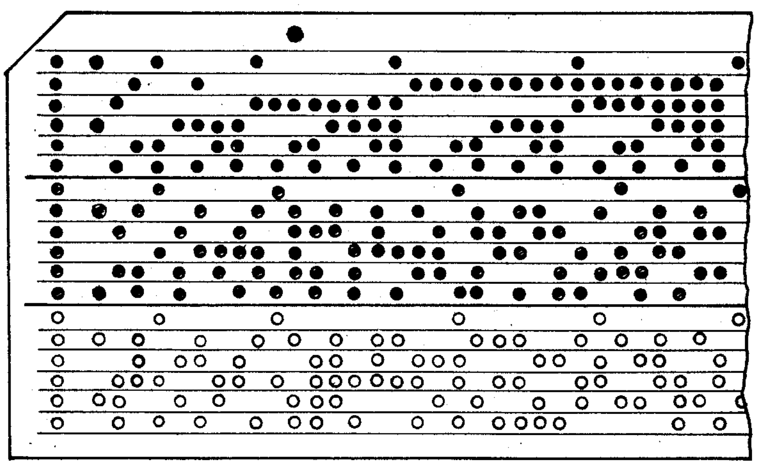
Fig. 3 illustrates a card containing data pertaining to the same transaction in three fields, which fields are placed behind each other in the direction of movement of the cards.

The card illustrated in Fig. 3 contains three fields, each of which is intended for taking up multiple perforations consisting of six symbols. As compared with the card illustrated in Fig. 1, such a card is capable of taking up three times the number of symbols. A large number of symbols referring to the same transaction can thus be placed on this card. Since according to the process of the invention the fields of the card are read and analysed in one operation, this card, as compared with the use of a main card with a number of supplementary cards, presents the advantage of a substantially increased capacity, because instead of a number of operations for analyzing the main and supplementary cards only one single operation is required.

Figure 4:
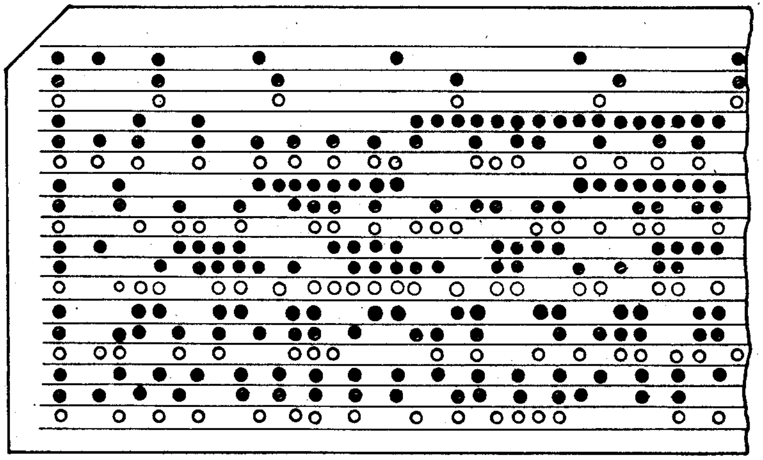
Fig. 4 illustrates a card containing data pertaining to the same transaction in three fields, these fields being divided into strips in such a manner that strips succeeding each other in the direction of movement of the cards belong to different fields.

The punched card illustrated in Fig. 4 contains three fields for taking up symbols, which fields have been divided into strips in the same way as with the card according to Fig. 2, each strip containing a symbol position. The various fields of this card have been provided with the same perforations as the non-divided fields of the card according to Fig. 3. The symbols of the various fields are distinguished in the same manner as in Fig. 3, the symbols of the first field being represented by black dots, those of the second field by hatched circles and those of the third field by simple circles.

Figure 5:
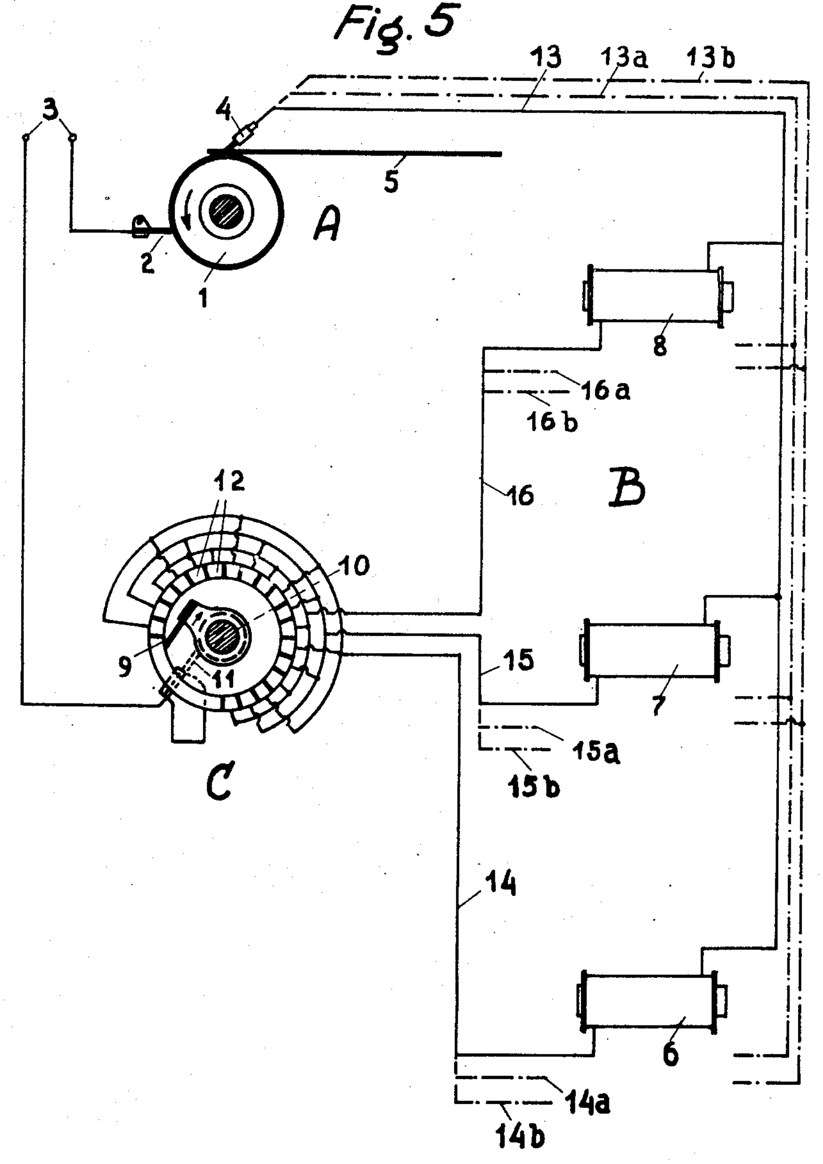
Fig. 5 illustrates an apparatus for carrying out the process according to the invention.

The apparatus for carrying out the process according to the invention, as illustrated in Fig. 5, mainly consists of the reading device A, the analyzing device B and a distributor C, which latter transfers the movements or power, brought about by the symbols of the punched cards read, to the analyzing devices belonging to the various fields.

The reading device A consists of a metal roller 1, connected via a brush 2 with one pole of a current source 3, and further of reading brushes 4. The number of brushes corresponds with the number of columns of the various fields of the card 5 to be read. In the figure only one reading brush 4 has been illustrated, while it is only denoted by other conductors that there are a larger number of brushes.

In the apparatus illustrated the analyzing device B consists of three parts, each controlled in accordance with one of the three fields the card contains. Since widely varying devices may be used as analyzing devices, e. g. printing apparatuses or calculating mechanisms, only three magnets for controlling the appertaining devices have been illustrated in the drawing, the bottom magnet 6 belonging to the first field, the middle magnet 7 to the second field and the top magnet 8 to the third field of the card.

The distributor C consists of a rotating contact brush 9, connected conductively to the second pole of the current source 3 by means of a slip ring 10 and a fixed brush 11. The rotating contact brush 9 rotates at a rate corresponding to the rate of movement of the cards, one revolution of the contact brush 9 corresponding to the distance between the face of one card and that of the preceding card. The brush 9 slides along a contact strip 12 having eighteen contacts, each of which corresponds to a strip of the field of the punched card to be read. The contacts belonging to the strips of a field are interconnected conductively. Thus, viewed in the direction of rotation of the rotating brush 9, the first contact is connected to the fourth, seventh, tenth, thirteenth and sixteenth. The second contact is connected to the fifth, eighth, eleventh, fourteenth and seventeenth and the third contact to the sixth, ninth, twelfth, fifteenth and eighteenth. From the interconnected groups of contacts of the contact strip 12, conductors pass to the appertaining magnets of the analyzing device B.

The parts of the analyzing device B which belong to the various fields of the card 5 naturally have a number of magnets 6, 7, 8. In order to indicate the manner in which the other magnets are connected, the connections of two other magnets respectively have been indicated in Fig. 5 by dotted lines; besides the conductor 13 connecting the one reading brush 4 to the ends of the coil of the magnets 6, 7, 8, two other conductors 13a and 13b have been sketched, which start from other reading brushes 4 and are connected to the ends of the coil of the other magnets 6, 7, 8. In accordance with this, two branches 14a, 14b, 15a, 15b and 16a, 16b respectively have also been sketched near the conductors 14, 15 and 16.

Since the punched card 5 to be read is a card of the type illustrated in Fig. 4, on which multiple perforations, each consisting of six symbols, have been made in each of the three fields, the magnets 6, 7, 8 naturally cannot be used direct to control a printing apparatus or a calculating mechanism. On the contrary, the magnets 6, 7, 8 have to actuate suitable transmission gears, by which in turn the printing apparatus or the calculating mechanism is controlled. Such transmission gears are known and serve to convert the electrical impulses brought about by the multiple perforations into single electrical impulses, by which in turn the analyzing device, e. g. a printing apparatus or controlling mechanism, is controlled.

The apparatus illustrated in Fig. 5 is operated as follows: When in the reading device A the first strip of the first field of the card 5 is fed under the reading brush 4, the contact brush 9 is exactly on the first contact of the contact strip 12, belonging to the strip of the field. When in the first strip of the first field perforations are read by the brushes 4, the latter bring about contact with the metal roller 1 in the respective places, so that the circuit is closed via the magnet or the magnets 6. The magnets 6 belonging to the first columns of the first field of the card 5 are thus energized and bring about the respective control operations.

When the card 5 is moved on, the first strip of the second field of the card is fed under the reading brush 4. At the same time the contact brush 9 of the distributor C reaches the second contact of the contact strip 12, belonging to the first strip of the second field, so that now one or more circuits, according to the number of perforations in the strip read, are brought about via the magnets 7. The magnets 7 belonging to the columns where perforations have been made in the first strip of a second field thus attract their armatures and bring about the respective control operations.

The first strip of the third field is fed under the reading brush 4, the contact brush 9 simultaneously sliding on the third contact of the contact strip 12 of the distributor C. Now the magnets 8, belonging to the third field of the card, are connected to the current source 3 via the distributor C, so that the magnets 8, which belong to columns in which the reading brushes 4 fall on perforations, take up current and bring about the respective control operations.

In the same way the magnets 6, 7, 8 are connected correctly to the current source 3 by the distributor C when the second and third strips respectively of the various fields pass under the brush, the magnet or magnets 6, 7, 8 respectively belonging to the respective strip thus taking up current. The apparatus illustrated thus makes it possible to read and analyse in one and the same operation the three fields of symbols lying behind each other in the direction of movement of the card during the said movement of the card. In addition the apparatus according to Fig. 5 presents the advantage that owing to the division into strips of the various fields the distance between the various strips belonging to the same field is relatively large, so that the distance between the various electrical impulses conducted to the same magnets is correspondingly large. Consequently there is a comparatively long interval between the attraction and the release of the armatures, which warrants a reliable operation of the magnets, or—which amounts to the same thing—the reading can be done at a very high rate without incurring the risk of the magnetic control refusing to operate.

The apparatus for multiple perforations with six symbol positions illustrated in Fig. 5, can naturally also be used for analyzing cards provided with single perforations, the symbol positions of which have been placed in fields divided into strips according to Fig. 2 or 4. In such a case, if a card containing three fields divided into strips were to be analysed, a distributor C would have to be provided, the contact strip 12 of which would have to contain thirty contacts instead of the eighteen illustrated in Fig. 5, of which contacts the first would again have to be connected to the fourth, seventh, etc. For the analysis of such a card, no separate transmission gears for converting the multiple electrical impulses into single impulses would be required; on the contrary, the analyzing devices of an analyzing apparatus could be controlled direct by the electrical impulses brought about by the reading device.

Figure 6:
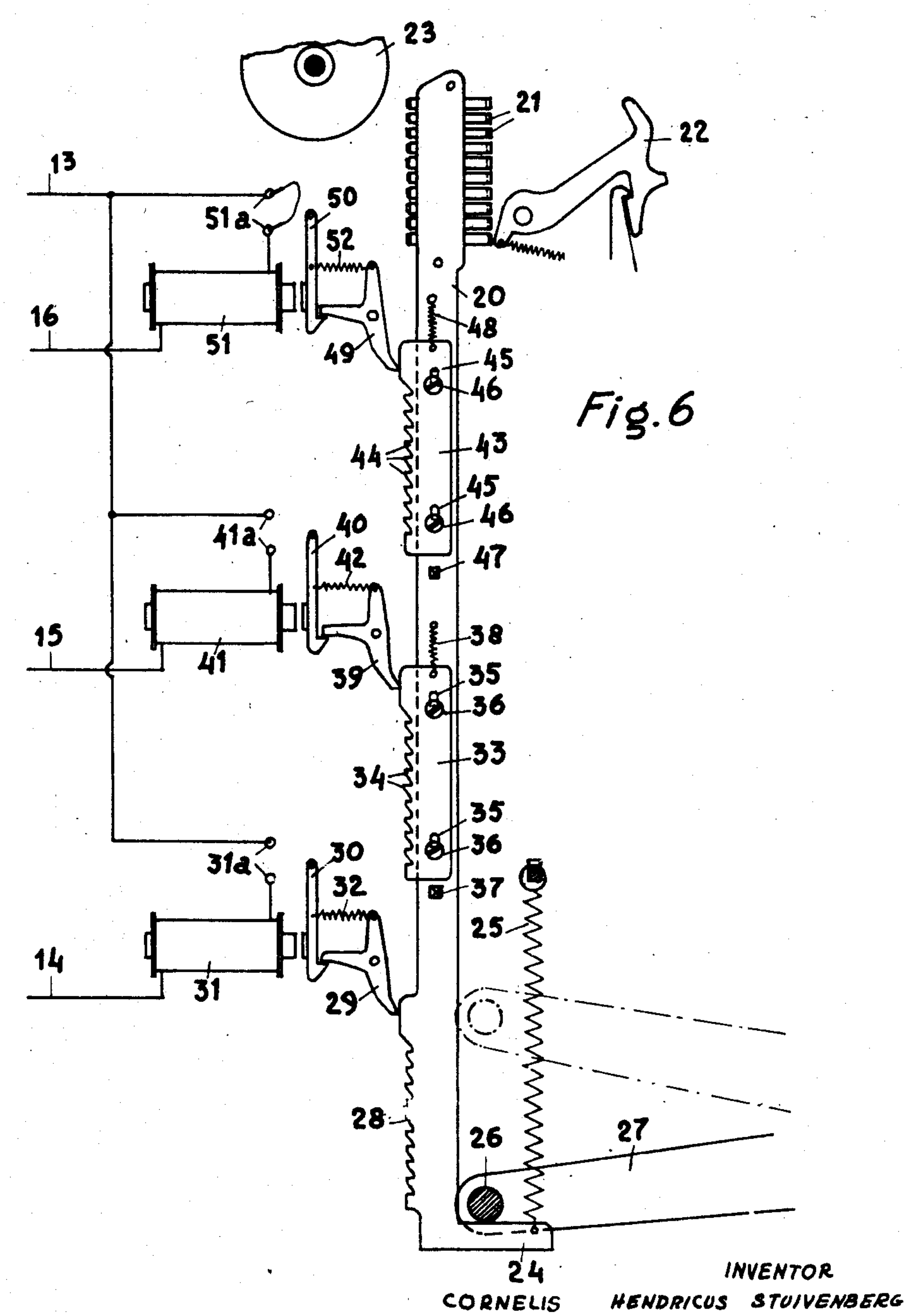
Fig. 6 illustrates a type bar of a printing apparatus, the said type bar being equipped with two retarding devices and being capable of use for printing data from anyone field of a card provided with three fields divided into strips.

In Fig. 6 a type bar of a printing apparatus has been illustrated as an example of such an analyzing device. The adjustment of the type bar can be controlled at will by the first, second or third field of the card. In Fig. 6 the type bar is denoted by 20. 21 are the types of the type bar, which may be struck against the printing roller 23 by a printing hammer 22 when they have been placed in the printing position by the upward movement of the type bar 20. At the bottom the type bar 20 has a projecting part 24, actuated by a spring 25, which tries to pull up the type bar. The upward movement of the type bar 20 is prevented by a rod 26 provided between two levers 27. The levers 27 are controlled in the known manner, so that the rod 26 is moved up, in the position indicated by dotted lines, in the first part of each operation of the machine, the type bar or the type bars thus being released for a given upward movement.

At the bottom the type bar 20 further has a row of teeth 28, with which a pawl 29 can co-operate. The pawl 29 may be released in the known manner by the hook-shaped armature 30 of a magnet 31, so that by the influence of a spring 32 the pawl reaches its locking position and drops into the teeth 28 of the type bar 20.

On about the center portion the type bar 20 carries a slide 33 sliding along the type bar, which is provided with teeth 34 and has oblong holes 35 through which extend abutment screws 36, screwed into the type bar 20. Below the slide 33 an abutment 37 has been provided against the type bar 20, which limits the downward movement of the slide 33 with respect to the type bar 20. The distance of the abutment 37 from the bottom of the slide 33 corresponds to one third of the pitch of the teeth 34 and 28 respectively. A spring 38, which is very weak in comparison with the spring 25, pulls the slide 33 up into the highest position, illustrated in Figure 6, with respect to the type bar 20, which position is determined by given dimensions of the oblong holes 35. The pawl 39, which may be released by an armature 40 of a magnet 41 and is influenced by a spring 42, co-operates with the teeth 34.

At the upper part of the type bar 20 another slide 43 with teeth 44 has been provided, which is capable of sliding along the type bar 20 by means of abutment screws 36 screwed into the type bar 20 and engaging oblong holes 46 and is pulled into its topmost normal position by a spring 48. 47 is an abutment of the type bar 20 limiting the downward movement of the slide 43, which in this case has been provided at a distance of ⅔ of the pitch with respect to the bottom of the slide 43. Here, too, a pawl 49 has been provided for co-operation with the teeth 44 of the slide 43, which pawl can be released by an armature 50 of a magnet 51 and is influenced by a spring 52.

In order to enable a type bar to be adjusted at will to control by the field 1, 2 or 3, the magnets 31, 41, 51 are connected to plugs 31*a*, 41*a*, 51*a*. By bringing about a given plug connection the end of the coil of one of the magnets 31, 41, 51 may be connected to the conductor 13, which corresponds to the conductor passing to the reading brush 4 in Fig. 5. The free coil ends of the magnets 31, 41, 51 are connected to conductors 14, 15, 16 passing to the distributor, which conductors correspond to the conductors with the same reference numbers in Fig. 5.

If a printing apparatus is to be adjusted in accordance with the symbols in the three fields of a card, the number of type bars according to Fig. 6 to be provided will have to be in accordance with the requirements for printing the data corresponding to the symbols. Those of the type bars which are to print the data of the first field are connected in a given manner by bringing about the plug connections 51*a*. With the type bars which are to print the data of the second field, plug connections 41*a* are brought about and with the type bars which are to print data of the third field, the plug connections 31*a* are brought about. Thus, with each type bar only one magnet 31, 41 or 51 is operating.

It is first assumed that the particular type bar has been adjusted to an analysis of the first field of the card by a connection via the plug 51*a*. It is further assumed that in the respective column in the first field of the card the digit 5 has been punched, so that a perforation is present in the strip of the first field belonging to the 5 position. When, while the card passes under the respective reading brush, the circuit for the magnet 51 is closed, the pawl 49 is released by the attraction of the armature 50, so that the said pawl drops into the teeth 44 of the slide 43 under the influence of the spring 52. Before the pawl 49 is disengaged, the type bar 20, and accordingly the slide 43, which is kept in its top position with respect to the type bar by the spring 48, has moved so far that the opening of the teeth 43 belonging to the digit 5 is opposite the pawl 49. When, therefore, the pawl 49 drops into the opening, it gears into the opening belonging to the digit 5 and checks the slide 43, so that it can no longer take part in any further upward movement of the type bar 20. After having covered a distance corresponding to ⅔ of the pitch the abutment 47 engages the bottom of the slide 43 and thus prevents the further upward movement of the type bar. When the type bar is so adjusted, the type 21 bearing the digit 5 is in the writing position. The printing of the figure is effected in the known manner by releasing the printing hammer 22. During the second part of the operation of the machine the levers 27 carrying the rod 26 are moved down again; they thus press back the type bar into its position of rest. At the same time the slide 43 slides back into its top position under influence of the spring 48, after which it is taken along by the type bar 20 in the downward movement. During this movement the pawl 49 glides along the various teeth 44 until, when the type bar reaches its position of rest, as illustrated in Fig. 6, the said pawl is pressed back so far by a projection at the top of the slide 43 that it is locked again by the hooked armature 50.

If the type bar illustrated is to print data of the second field of the card, the plug connection 51*a* has to be broken, while a plug connection 41*a* has to be brought about instead. The pawl 39 is controlled in the same manner as described above for the pawl 49. By the dropping of the pawl 39 into the teeth any further upward movement of the slide 33 together with the type bar 20 is prevented. When a distance corresponding to one third of the pitch has been covered, the abutment 37 comes to rest against the bottom of the slide 33, so that the type bar 20 cannot move further upward either.

Since the electric impulse, by which the release of the pawl 39 was attained, was brought about as much later as corresponds to the distance covered by the type bar corresponding to one third of the pitch of the slide 33, upon the magnet 41 coming into operation the type bar 20 was already in a position which is higher by one third of the pitch than in the case described above with reference to the operation of the magnet 51. When, after the pawl 49 has dropped, the type bar has previously covered ⅔ of the pitch, in order to place the type 21 with the digit 5 in the writing position, upon the magnet 41—which afterwards takes up current in a given manner—coming into operation the type bar may only cover a distance corresponding to one third of the pitch in order that the type 21 may accurately reach the writing position. In the case of the type bar illustrated this requirement is met by means of the slides 33, 43 operating with a delay of varying degrees.

When the type bar is to print data of a third field of the card, plug connections 31*a* have to be brought about in order to close the circuit for the magnet 31. Upon the magnet 31 coming into operation the pawl 29 drops into the teeth 28 of the type bar 20 and at once, i. e. without delay, prevents any further upward movement thereof. Since the electrical impulse by which the magnet 31 was energized was brought about as much later as corresponds to ⅔ of the pitch of the type bar, during the dropping of the pawl 29 the type bar 20 was already in a correspondingly higher position, so that, owing to the type bar 20 being checked at once, the type 21 has been placed accurately into the writing position again.

As appears from the above, with a printing mechanism equipped with type bars according to Fig. 6 it may be decided at will by which fields of the card the various type bars are to be controlled. It is naturally also possible to analyse not all data of each field, but only certain sections of the field. Thus, with a printing apparatus with 120 type bars, the first 40 type bars may be connected to any of the columns of a field, while 40 more type bars are placed on another field and the remaining 40 on the third field. By bringing about certain plug connections it is also possible to make any desired changes in the order of the data to be printed in the printing line. Further it is possible to punch the digits of a number comprising a plurality of value positions in different fields, e. g. in the case of the number "375" the digit 3 in the first field, the digit 7 in the second field and the digit 5 in the third field, i. e. all the digits in the same column of each field, and then to print the three digits as a number with three value positions in direct succession by means of a printing apparatus with type bars, as illustrated in Fig. 6.

Above a printing apparatus has been explained for analyzing cards with three fields in which single perforations had been made as symbols. It stands to reason that the construction illustrated can also be used with slight modifications for analyzing cards with only two fields, e. g. a card according to Fig. 2, in one operation. In that case the type bars of the printing apparatus would require only one slide 33 and 43, respectively, while the abutment 37 and 47 respectively, limiting the movement of the said slide, would have to be provided at a distance from the bottom of the slide corresponding to half the pitch. In that case, naturally two magnets only would be required for controlling a type bar.

Figure 7:
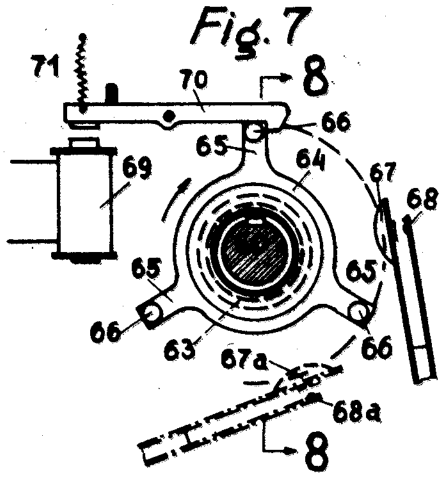
Fig. 7 illustrates a retarding device of different construction.
Figure 8:
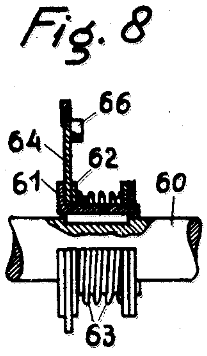
Fig. 8 is a cross-section through the retarding device of Fig. 7.

When the data of a card divided into three striplike fields, on which single perforations have been used as symbols, are to be analyzed in calculating mechanisms, retarding devices for the electrical impulses controlled by the first and second fields will be effective in this case, too. Figs. 7 and 8 illustrate a retarding device particularly adapted for controlling counters. A clutch comprising the driving discs 61 and 62 is connected to a shaft 60, which is driven at such a rate that it performs a complete revolution while the punched card to be analyzed is advanced by three counting-point positions of a field. The driving discs 61 and 62 are pressed together by a spring 63, and have arranged therebetween a driven disc 64 which has three symmetrical projections 65. Each projection 65 carries a round pin or roller 66, capable of co-operating with a contact 67 of the switch 67, 68. The projections 65 of the disc 64 co-operate with a retaining pawl 70, which can be controlled by a magnet 69 and is pulled into its locking position by a spring 71.

Normally, rotation of the disc 64 is prevented by the pawl 70 the nose of which engages the front face of a projection 65 of the disc. The slipping clutch 61—64, which naturally should have certain given dimensions so as not to run hot, thus slips normally. However, when at a given moment the magnet 69 is energized, the pawl 70 is turned back against the tension of the spring 71, so as to cause the nose of the pawl to disengage the respective projection 65. Consequently, the disc 64 is taken along by the axle 60 via the slipping clutch. The projection 65 with its roller 66, then passes underneath the contact 67 of the switch 67, 68, thereby causing the same to close. When the roller 66 has passed beyond the contact 67, the switch 67, 68 is opened again. The switch has been so provided with respect to the projections 65 of the disc 64 in their normal position that the closing of the switch is delayed for ⅔ of the distance between two projections 65. Consequently the switch 67, 68 is closed and opened again with a given delay, so that the electrical impulse energizing the magnet 69 can be transmitted as a new, periodically later electrical impulse.

At the end of the electrical impulse energizing the magnet 69 the pawl 70, under the influence of the spring 71, returns to its locking position, so that the next projection 65 of the disc 64 is checked again. If, therefore, the magnet 69 is energized during a short period, only one electrical impulse is transmitted by the switch 67, 68.

In Fig. 7 an additional switch 67a, 68a has been indicated by dotted lines, which switch operates with a slight delay with respect to the switch 67, 68. As will be evident, the retarding device illustrated can be used to bring about any desired delay of the electrical impulses.

Figure 9:
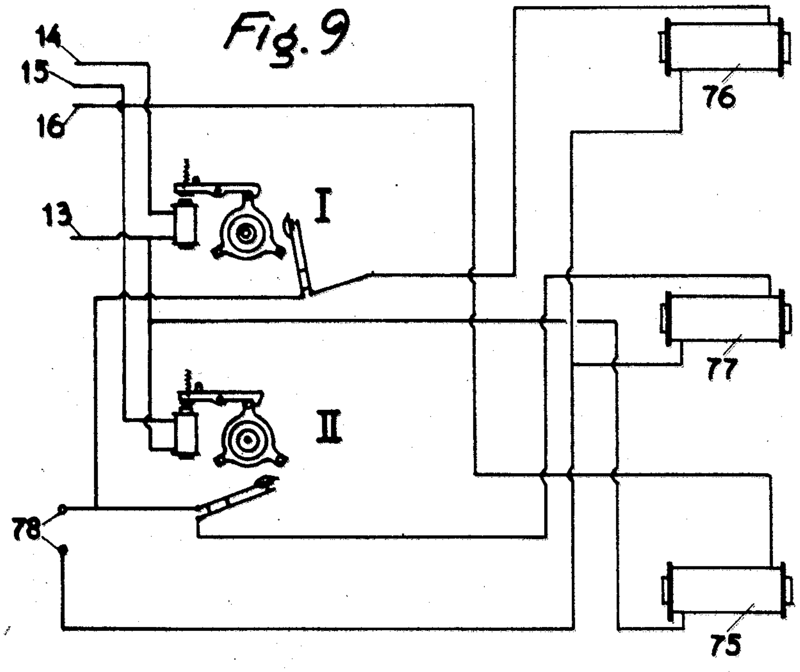
Fig. 9 illustrates a diagram of connections for an analyzing machine, provided with retarding devices according to Figs. 7 and 8.

Fig. 9 illustrates an example of the manner in which the magnets of an analyzing apparatus can be controlled when retarding devices according to Figs. 7 and 8 are employed. In this figure, too, only three magnets have been shown, which are controlled by a reading brush. The conductor connected to this brush has been denoted by the reference numeral 13, just as in Fig. 5. The conductors connected to the contacts of the divider have also been denoted by the reference numerals 14, 15, 16, likewise as in Fig. 5. The conductor 14 is connected to the contacts belonging to the first field of the punched card and the conductors 15 and 16 are connected to the second and third fields of the card. While the conductor 14 passes along the magnet coil of a retarding device I equipped with a switch, which is closed after the disc 64 of the retarding device has rotated a distance corresponding to two thirds of the distance between two symbol positions of the first field I of the card to be analyzed, the conductor 15 passes along the magnet coil of a retarding device operating at half this delay. The conductor 16 is connected directly to the conductor 13 via a magnet 45. The switches of the retarding devices I, II close circuits for the magnets 76, 77, which are fed by a current source 78. Consequently, when the switch of the retarding device I is closed, the magnet 76 is energized, and when the switch of the retarding device II is closed, the magnet 77 is energized.

When for example the same digit has been punched in all three fields of the cards in the column read by means of the reading brush connected to the conductor 13, electrical impulses are transmitted successively via the conductors 15, 14 and 16, each electrical impulse with a time lag with respect to the preceding impulse corresponding to ⅓ of the distance between two adjacent strips of the same field.

The electrical impulse passing via the conductor 14 is transferred with a delay of ⅔ to the magnet 76 and the electrical impulse passing via the conductor 15 with a delay of ⅓ to the magnet 77, while the electrical impulse passing via the conductor 16 energizes the magnet 75 directly. Since the delayed transfer of the electrical impulses brought about by the retarding devices I and II is effected with delays corresponding to the distance of the respective strips of the third field, the magnet 76, 77 are energized at the same moment as the magnet 75. Thus all three magnets come into operation simultaneously.

When, for example, the digit 5, which is to be transferred to a counter, has been punched on each of the fields read in the column analyzed by means of the reading brush, three counting wheels provided on the same driving shaft can be transmitted via the digit 5 by simultaneously disconnecting the respective clutches. With the analyzing apparatus described, equipped with the retarding devices I and II, it is thus possible to transfer the data present in various fields of a punched card divided into columns to the counting wheels of one or more counters to be driven by a joint driving axle. It is also possible to transfer digits punched in different fields to counting wheels of a counter placed side by side.

In the retarding device illustrated in Figs. 7 and 8, as well as in the retarding devices I and II of Fig. 9, the delays have been so chosen that a card with three striplike fields can be analyzed. It stands to reason that the analyzing apparatus illustrated in Fig. 9 can also be so constructed that cards with two striplike fields can be analyzed. In such a case the magnet 76 and the retarding device I would be eliminated. The switch 67*a*, 68*a* (vide Fig. 7) would have to be so arranged as to be closed with a delay corresponding to half the distance of the strips.

What I claim is:

1. In an apparatus for analyzing the symbols of a symbol carrier such as a record card having a plurality of fields of symbol places in one and the same column, with a symbol place of one field directly followed by a symbol place of another field, the combination of sensing means operable to sense a symbol place of each field of one and the same column prior to sensing another symbol place of each said last mentioned fields, analyzing means including means respectively pertaining to said fields for analyzing the sensed symbols on said symbol places, distributing means interposed between said sensing means and said analyzing means for individually conveying and distributing the symbols sensed by said sensing means to said analyzing means in accordance with the field to which said symbols belong, and switch means associated with said distributing means and rotating in accordance with the movement of said symbol carrier by said sensing means, said switch means being adapted to establish communication between said distributing means and said analyzing means for each field of symbols.

2. In an apparatus for analyzing the symbols of a symbol carrier such as a record card having a plurality of fields of symbol places in one and the same column, the combination of sensing means operable successively to sense the symbol places of the fields of one and the same column so that during one and the same passage of said carrier in longitudinal direction of said column the first symbol place of each field is sensed before the next symbol place is sensed, analyzing means including printing means for analyzing and printing the sensed symbols, said printing means including at least one reciprocable type bar carrying a plurality of types corresponding to symbols of different fields of the same column, distributing means interposed between said sensing means and said analyzing means and operatively associated therewith for individually distributing and conveying signals or impulses corresponding to the sensed symbols on said symbol places to said analyzing means, a plurality of control means, each type bar being provided with as many control means as there are symbol fields in a column of symbols, and lost motion means interposed between said controlling means and each type bar for causing a predetermined time lag in the operation of the printing types corresponding to the sensed symbols of the different fields of the same column.

3. In an apparatus for analyzing the symbols of a symbol carrier such as a record card having a plurality of fields of symbol places in one and the same column, with a symbol place of one field directly followed by a symbol place of another field, the combination of sensing means arranged to sense successively the symbol places of an entire column in the sequence in which they appear in said column, analyzing means including printing means for analyzing and printing the symbols of the sensed symbol places, said printing means including at least one reciprocable type bar carrying a plurality of types corresponding to the number of symbol places in the different fields of symbol places pertaining to one and the same column, adjusting means, connecting means operatively connecting said adjusting means with said type carriers, said adjusting means having a lost motion connection with the said carriers of such magnitude that a delay is caused in the transmission of the adjusting controls equal to the shift of time in the control to which the field last sensed in the column is subject.

4. In an apparatus for analyzing the symbols of a symbol carrier such as a record card having a plurality of shifted fields of symbol places in one and the same column, with a symbol place of one field immediately followed by a symbol place of another field, except for the last symbol place of the column, the combination of a single sensing means operable to sense successively the symbols of the fields of one and the same column during one and the same movement of said carrier, and distributing means movable in unison with said carrier and operatively connected with said sensing means for separating and separately translating the individually sensed symbols on said symbol places into perceivable indications of said symbols.

5. In an apparatus for analyzing the symbols of a symbol carrier such as a record card having a plurality of successive fields of symbol places in one and the same column, with a symbol place of one field immediately followed by a symbol place of another field, except for the last symbol place of the column, the combination of sensing means operable during one and the same movement to sense successively one symbol place of each of the fields of one and the same column prior to sensing another symbol place of each of said last-mentioned fields, analyzing means including means respectively pertaining to said fields for analyzing the sensed symbols, distributing means interposed between and operatively associated with said sensing means and said analyzing means for individually translating and transferring the sensed symbols to said analyzing means, said distributing means being driven in synchronism with the relative movement of the carrier and sensing means.

6. In an apparatus for analyzing the symbols of a symbol carrier such as a record card having a plurality of fields of symbol places in one and the same column, the combination of sensing means operable to sense a symbol place of each field of one and the same column prior to sensing another symbol place of each of said last-mentioned fields, analyzing means including means pertaining to the various fields for analyzing the sensed symbols of said symbol places, distributing means for receiving signals or impulses from said sensing means and for separating and conveying the same to said analyzing means, and retarding means interposed between said dstributing means and said analyzing means for retarding the transfer of signals or impulses from said distributing means to said analyzing means so that the analyzing means are put into operation simultaneously for all fields of each column.

7. In an apparatus for analyzing the symbols of a symbol carrier such as a record card having a plurality of fields of symbol places in one and the same column, with each symbol place of one field followed by a symbol place of another field with the exception of the very last symbol place of each column, the combination of sensing means operable successively to sense the symbol places of the fields of one and the same column so that during one and the same passage of said carrier in the longitudinal direction of said column, the first symbol place of each field is sensed before the next symbol place of each field is sensed, analyzing means including printing means for analyzing and printing the sensed symbols, said printing means including at least one reciprocable type bar carrying a plurality of types corresponding to symbols of different fields of the same column, distributing means interposed between said sensing means and said analyzing means for individually distributing and conveying signals or impulses corresponding to the sensed symbols to said analyzing means, and controlling means operable to control the movement of the analyzing means so as to cause a predetermined time lag in the operation of the printing types corresponding to the sensed symbols of the different fields of the same column, said controlling means having first means sensitive to an impulse from said distributing means, and time delay means controlled by said first means for initiating an impulse for controlling said printing means.

8. In an apparatus for sensing the symbols of a symbol carrier such as a card having a plurality of columns and each column comprising a plurality of fields of symbol places with each symbol place of one field immediately followed by a symbol place of another field, except for the last symbol place of each column, unitary sensing means for traversing each column operable to sense all of the symbol places of the associated column in succession during one and the same movement of the carrier, a circuit in which the sensing means is operatively connected for conducting sensing impulses from the said sensing means, a translating means in said circuit means pertaining to each field operable by the sensing impulses, and distributing means in said circuit means in series with said translating means for separating and directing the sensing impulses to said translating means, said distributing means comprising a movable element connected for movement in timed relation to the relative movement of said sensing means and said carrier.

9. In an apparatus for sensing the symbols of a symbol carrier such as a card having at least one column of symbol places comprising at least two shifted fields with the symbol place of one field being immediately followed by the symbol place of another field, except for the last symbol place of the column, a unitary means for traversing the column operable to sense all of the symbol places in succession during one and the same movement of the carrier, a translating device for each said field, and a distributor in circuit with said sensing means movable in synchronism with said carrier operable to place the sensing means in circuit with the translating devices in succession and repetitively and at the instants that the sensing means is sensing the symbol places of the respective fields pertaining to the translating devices.

10. In an apparatus for sensing the symbols of a symbol carrier such as a card having at least one column of symbol places comprising at least two shifted fields with the symbol place of one field being immediately followed by the symbol place of another field, except for the last symbol place of the column, a unitary means for traversing the column operable to sense all of the symbol places in succession during one and the same movement of the carrier and to create an electrical impulse whenever a symbol is sensed, a rotary contact in circuit with said sensing means, a bank of fixed contacts arranged to be swept by said rotary contact at the same rate that the said sensing means traverses said symbol places, and said fixed contacts being connected in groups according to the same pattern as the shifted fields of symbol places in the column.

11. In an apparatus for sensing symbol places arranged in a column on a carrier, the said symbol places being arranged in shifted fields, a distributor having a movable member adapted for connection with a unitary sensing means operable to sense all of the symbol places in the column in succession during one and the same movement of the carrier, said distributor also comprising a plurality of elements positioned for successive engagement by said movable member during movement thereof and at the same rate as said sensing means senses said symbol places, and said elements being adapted for connection in groups in the same pattern as the shifted fields of symbol places in the column so that there is a group of elements pertaining to each field of symbol places, whereby the sensing means is always connected with one of the group of elements pertaining to the field of the symbol place being sensed by the said sensing means.

12. In an apparatus for analyzing the symbols of a symbol carrier such as a record card having several groups of symbol places with the symbol place pertaining to one group directly followed in each column by a symbol place pertaining to the group next in cyclic order, the combination of sensing means operable to sense a symbol place of each group of one and the same column prior to sensing another symbol place of each of said last mentioned groups, analyzing means including means respectively pertaining to said groups for analyzing the sensed symbols on said symbol places, distributing means interposed between said sensing means and said analyzing means for individually conveying and distributing impulses issued from said sensing means and representing said symbols to said analyzing means in accordance with the group to which said symbols belong, and switch means associated with said distributing means and adapted to establish communication between said distribution means and said analyzing means for each field of symbol.

CORNELIS HENDRICUS STUIVENBERG.

References Cited in the file of this patent

UNITED STATES PATENTS

| Number | Name | Date |
|---|---|---|
| 1,623,164 | Carroll | Apr. 5, 1927 |
| 1,769,022 | Goerlitz | July 1, 1930 |
| 2,053,063 | Bryce | Sept. 1, 1936 |
| 2,120,071 | Keefe | June 7, 1938 |
| 2,195,865 | Lang | Apr. 2, 1940 |